(12) United States Patent
Raftis

(10) Patent No.: US 6,953,059 B2
(45) Date of Patent: Oct. 11, 2005

(54) CHECK VALVE WITH HANGER

(75) Inventor: Spiros G. Raftis, Pittsburgh, PA (US)

(73) Assignee: Red Valve Company, Inc., Carnegie, PA (US)

( * ) Notice: Subject to any disclaimer, the term of this patent is extended or adjusted under 35 U.S.C. 154(b) by 206 days.

(21) Appl. No.: 10/628,041

(22) Filed: Jul. 25, 2003

(65) Prior Publication Data

US 2004/0069360 A1 Apr. 15, 2004

Related U.S. Application Data

(60) Provisional application No. 60/399,214, filed on Jul. 29, 2002.

(51) Int. Cl.[7] ............................................. F16K 15/14
(52) U.S. Cl. ...................................... 137/846; 251/358
(58) Field of Search ......................... 251/358; 137/846, 137/847, 848, 849, 850

(56) References Cited

U.S. PATENT DOCUMENTS

| 171,817 | A | | 1/1876 | Kahk |
| 187,411 | A | | 2/1877 | Painter |
| 3,595,266 | A | * | 7/1971 | Brookman et al. ......... 137/519 |
| RE27,399 | E | * | 6/1972 | Urso ...................... 137/512.15 |
| 4,607,663 | A | | 8/1986 | Raftis et al. |
| 5,931,197 | A | | 8/1999 | Raftis et al. |
| 6,367,505 | B1 | | 4/2002 | Raftis et al. |

FOREIGN PATENT DOCUMENTS

| EP | 1077339 A2 | 2/2001 |
| FR | 2647161 A | 11/1990 |

* cited by examiner

Primary Examiner—Ramesh Krishnamurthy
(74) Attorney, Agent, or Firm—The Webb Law Firm

(57) ABSTRACT

A large diameter check valve has an upstream inlet part mountable on a discharge end of a conduit, a downstream outlet part adapted to prevent backflow of fluid through the check valve, and a transition part located between the upstream inlet part and the downstream outlet part. A support is included in the check valve to prevent drooping of the check valve via a cantilever effect. A method for supporting a check valve is also disclosed.

10 Claims, 8 Drawing Sheets

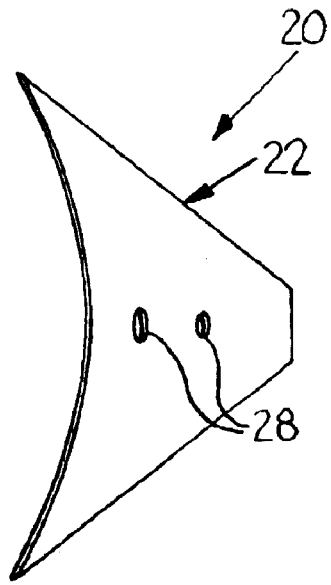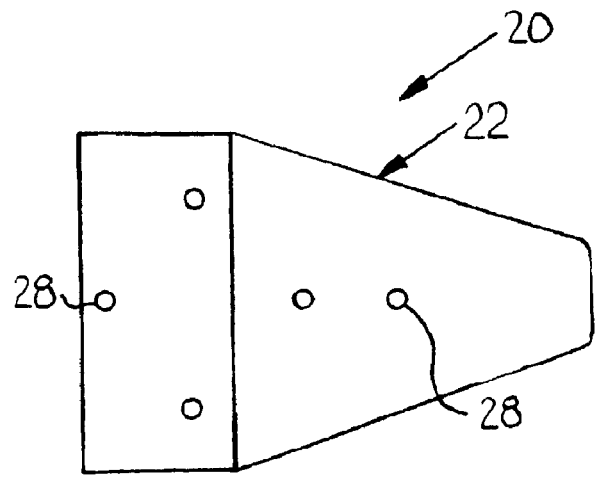
Fig. 1d                    Fig. 1c
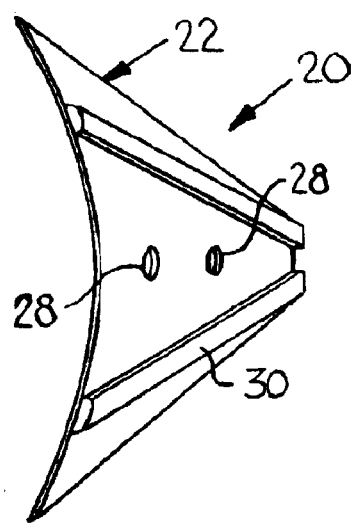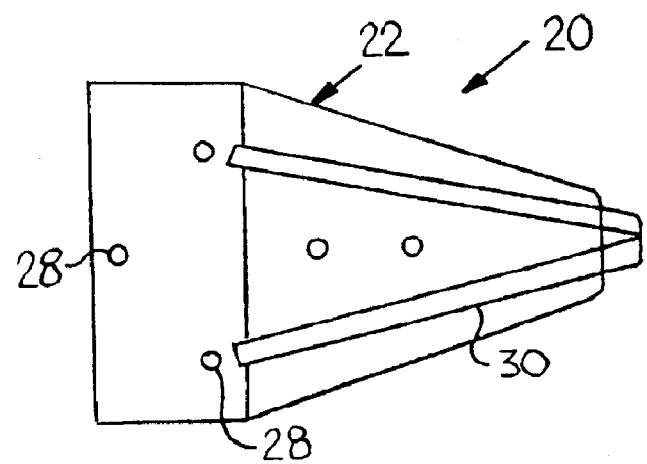
Fig. 2d                    Fig. 2c Fig. 3d
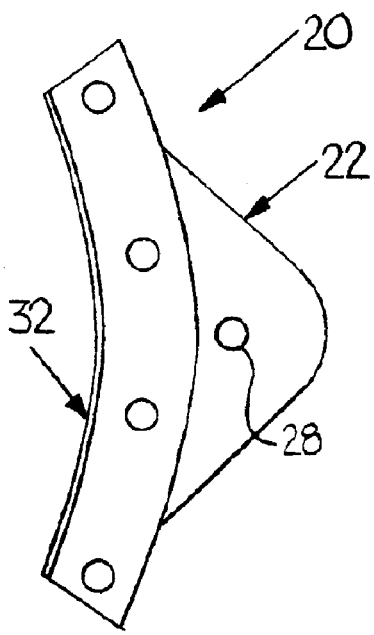
Fig. 3c
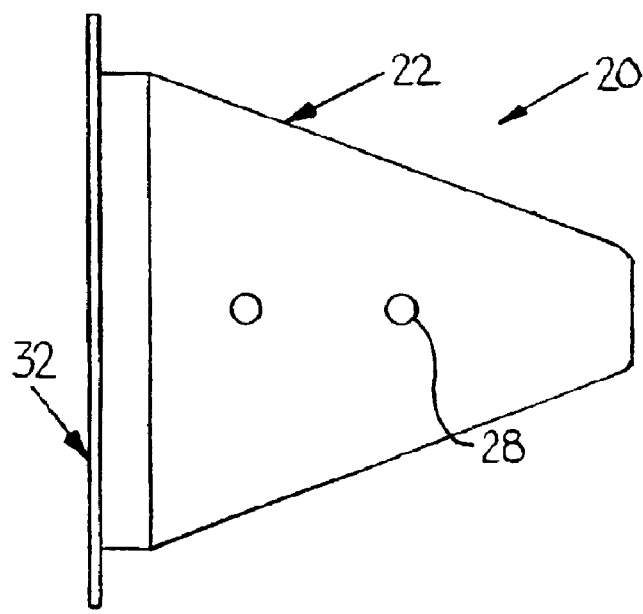
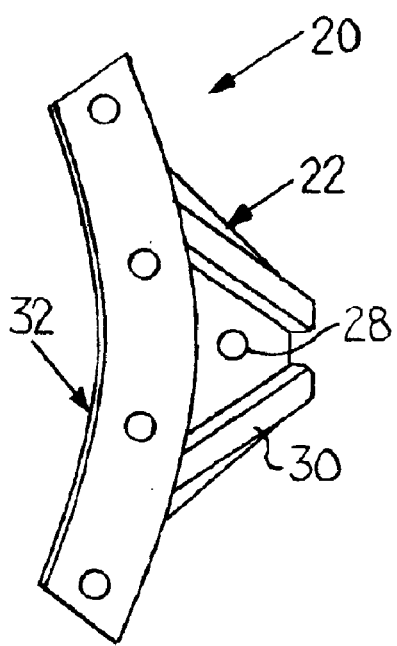
Fig. 4d
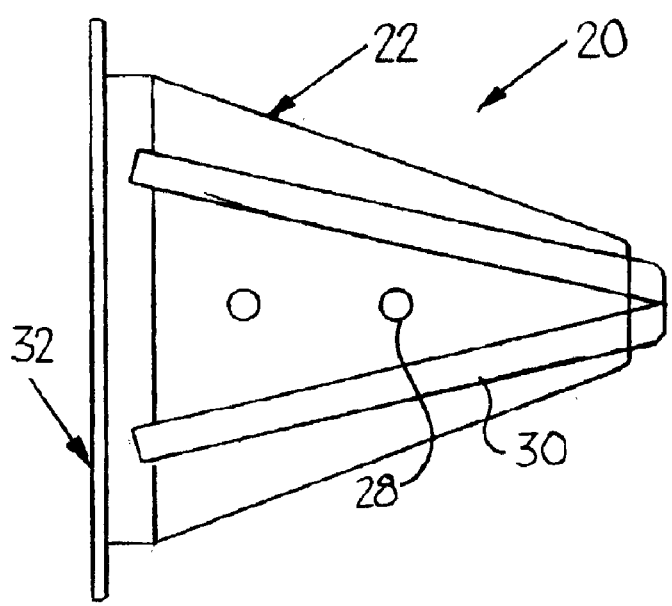
Fig. 4c

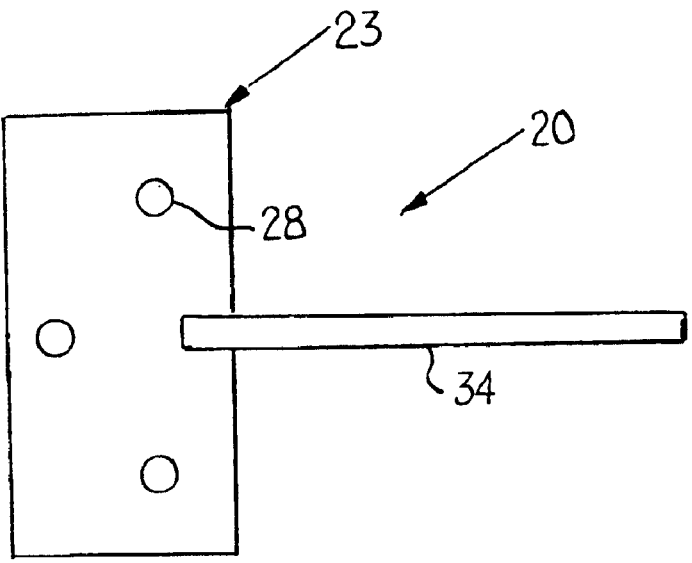
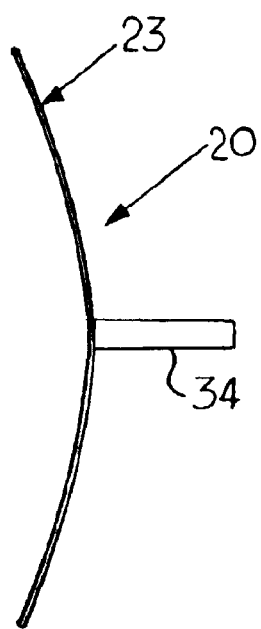
Fig. 5b    Fig. 5a
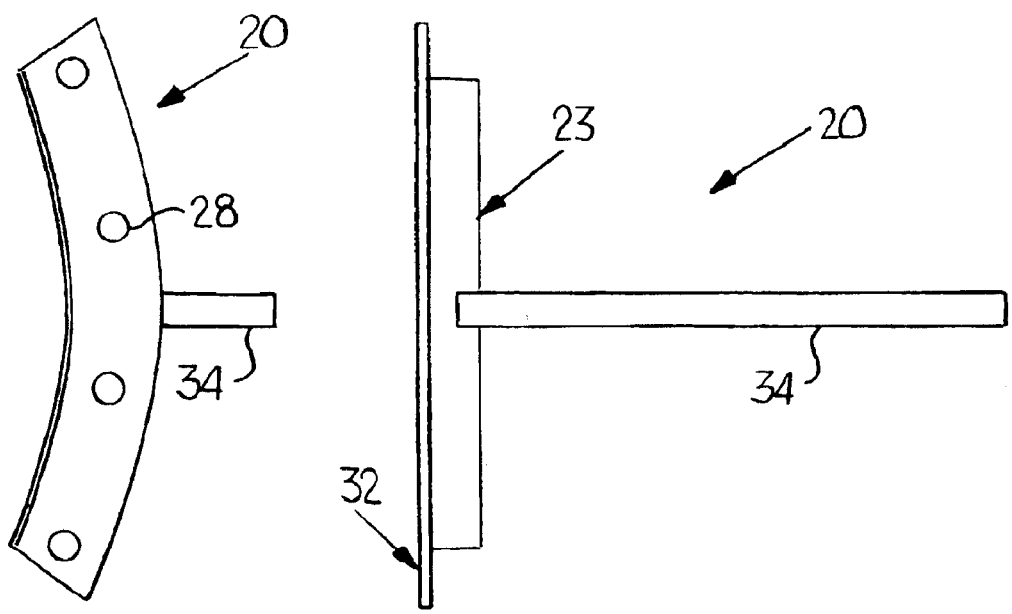
Fig. 6b    Fig. 6a

CHECK VALVE WITH HANGER

This application claims the benefit of Provisional Application No. 60/399,214, filed Jul. 29, 2002.

BACKGROUND OF THE INVENTION

1. Field of the Invention

The present invention relates generally to check valves and, in particular, to duckbill check valves with support assemblies.

2. Description of Related Art

A check valve is essentially a valve which allows fluid to flow in only one direction through a conduit, while closing and preventing back or reverse flow, when back pressure builds up downstream of the valve to a level greater than the upstream fluid pressure head. Check valves are used in various fluid transportation operations and must include some means of allowing a forward flow of liquid yet preventing any backflow.

Conventional elastomeric duckbill check valves have an inlet cuff (or a flange), an outlet bill and a transitional middle part for connecting the cuff and the bill. The bill includes a slit, which opens when fluid is forced through the valve. Typically, existing duckbill check valves have a bill slit length dimension that is equal to or less than one-half the inlet cuff's circumference.

To improve the performance of duckbill check valves, valves have been recently developed in which the width of the bill is larger than the diameter of the cuff. The area of the outlet part in the open position, thus approaches the area of the inlet part, and the headloss decreases. For example, U.S. Pat. No. 5,931,197 to Raftis et al. discloses an asymmetrical valve of this type and U.S. Pat. No. 6,367,505 to Raftis et al. discloses a check valve with an oversized bill.

Additionally, duckbill check valves have been recently mounted to the end of a pipe with the bill in the vertical position. By having the bill in the vertical position, the pipe will drain completely. Moreover, with bills in the vertical position, the stiffness of the duckbill check valve is increased. However, even with bills being placed in a vertical orientation, large diameter elastomeric duckbill check valves that are 36 inches in diameter or larger have a tendency to "droop" or sag under their own weight. The weight of the output area distorts the sealing area and allows backflow of water or sewage, which the valve is supposed to prevent.

As is broadly discussed in U.S. Pat. No. 6,367,505 to Raftis et al., local reinforcements may be embedded in the elastomeric material of a check valve with an oversized bill to enhance the stiffness of the elastomeric portion of the valve. Furthermore, as illustrated in U.S. Pat. No. 4,607,663 to Raftis et al., staggered embedded pads are used to provide sufficient strength for inversion and sagging resistance in a tide gate valve application. Moreover, EP 1077339A2 to Raftis and Duer teaches use of a support body receivable in the tide gate valve cavity but this is directed to reinforcing the transition part, so as to help prevent the tide gate valve from collapsing in and on itself when subject to backflow.

It is therefore an object of the present invention to provide a check valve assembly that overcomes the design problems associated with prior art duckbill check valves and to address the problem of drooping in large check valves. It is another object of the present invention to provide an improved duckbill check valve, which reduces the amount of unwanted backflow by decreasing the tendency of larger check valves to "droop" or "sag" under their own weight. It is further the object of the present invention to provide a support mechanism that can either be embedded or connected to an inner or outer portion of elastomeric material at only one location in the valve.

SUMMARY OF THE INVENTION

Disclosed is a duckbill check valve for preventing the backflow of fluid. The check valve is comprised of an inlet part mountable on the discharge end of a conduit, a downstream outlet part adapted to prevent backflow of fluid through the check valve a transition part located between the inlet part and the outlet part, and a support connected to an upper portion of the inlet part and at least the transition part.

The support can be embedded within the check valve, or attached to the inner surface or outer surface of the check valve by appropriate means. The support can consist of a rigid, curved plate, which can include ribs to increase the strength of the plate. Alternatively, the support can consist of a section of short curved plate being attached to the inlet part, with a bar extending from the short curved plate to at least the transition part. Additionally, the support can be adapted to be used in with a duckbill check valve having a "flanged" type mount.

A method is disclosed for supporting a duckbill check valve. The method is comprised of providing a support that can be attached to the inlet part and at least the transition part of the check valve such that the support forms a cantilever that extends from the end of the conduit into the check valve. The check valve thus hangs from the support. The support is attached to either the inside surface or the outer surface of the check valve.

BRIEF DESCRIPTION OF THE DRAWINGS

FIG. 1c is a top view of the support of FIGS. 1a and 1b according to the first embodiment of the present invention;

FIG. 1d is an end view of the support of FIGS. 1a and 1b according to the first embodiment of the present invention;

FIG. 2c is a top view of the support of FIGS. 2a and 2b according to the second embodiment of the present invention;

FIG. 2d is an end view of the support of FIGS. 2a and 2b according to the second embodiment of the present invention;

FIG. 3c is a top view of the support of FIGS. 3a and 3b according to the third embodiment of the present invention;

FIG. 3d is an end view of the support of FIGS. 3a and 3b according to the third embodiment of the present invention;

FIG. 4c is a top view of the support of FIGS. 4a and 4b according to the fourth embodiment of the present invention;

FIG. 4d is an end view of the support of FIGS. 4a and 4b according to the fourth embodiment of the present invention;

FIG. 5a is a top view of the support according to the fifth embodiment of the present invention;

FIG. 5b is an end view of the support according to the fifth embodiment of the present invention.

FIG. 6a is a top view of the support according to the sixth embodiment of the present invention;

FIG. 6b is an end view of the support according to the sixth embodiment of the present invention;

DETAILED DESCRIPTION OF THE PREFERRED EMBODIMENTS

The duckbill check valve assembly of the present invention is useful in many specialized applications, but particularly for use in drainage and sewage water effluent outfall lines.

Figure 1A:
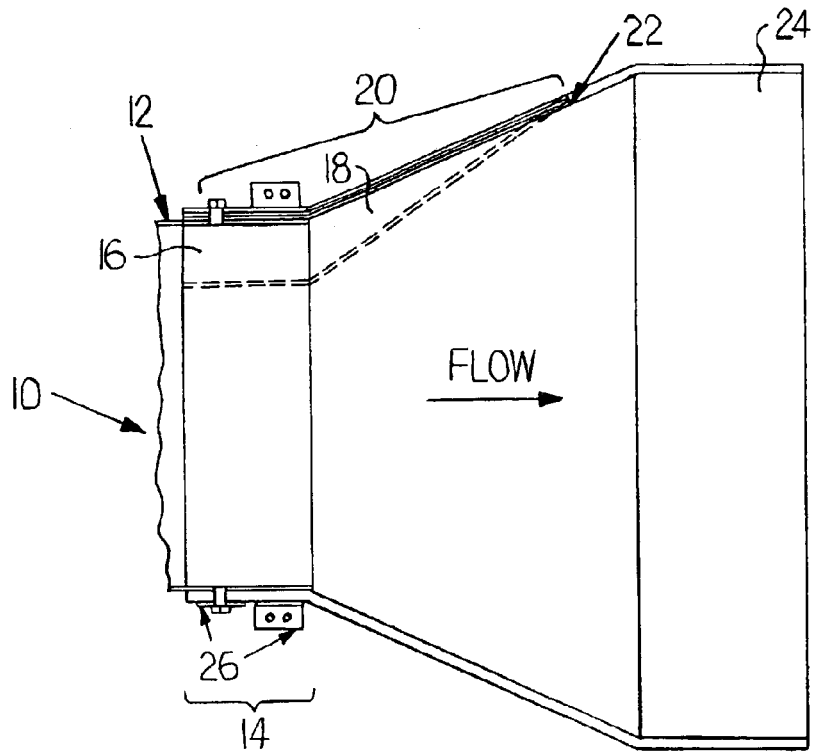
FIG. 1a is a side view of the first embodiment of the present invention in a closed position.
Figure 1B:
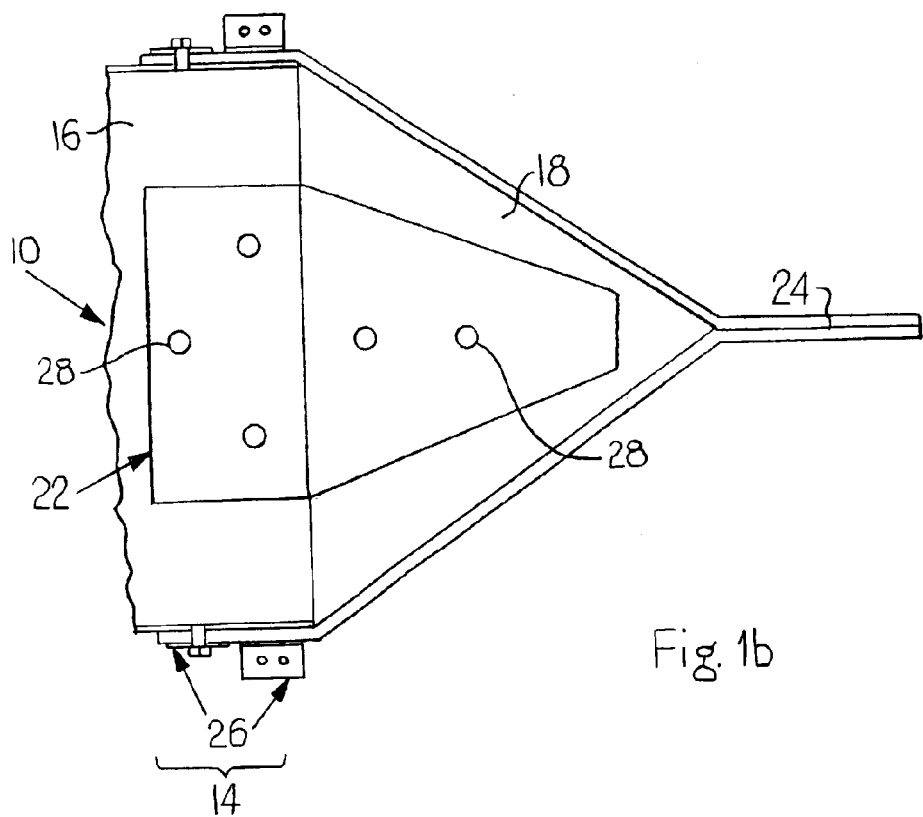
FIG. 1b is a top view of the first embodiment of the present invention in a closed position.

A duckbill check valve 10 with a support 20 according to the first embodiment of the present invention is shown in FIGS. 1a and 1b. The duckbill check valve 10 is comprised of an inlet part 16, a transitional part 18 and an outlet part 24, which appears as a pair of "lips" facing and engaging one another. The support 20 is comprised of a plate 22 attached or embedded to the duckbill check valve 10. The dashed lines indicate the outer periphery of the plate 22, when installed. The profile of the plate 22 basically mirrors the internal surface of the check valve in the inlet and transition (or "saddle") regions.

The duckbill check valve 10 is preferably made from an elastomer, such as neoprene, or an elastomer reinforced with synthetic fiber, such as nylon or polyester, with construction similar to an automobile tire. The inlet part 16 is generally made of a stiff, durable material, such as styrene butadiene, with polyester fabric reinforcing, whereas the outlet part 24 is made of a flexible material to allow proper opening and closing of the outlet part 24. The inlet part 16 is connected to the end of the customer's pipe 12 by a mounting mechanism 14, a "slip-on" type that consists of using steel band or clamps 26. The support 20, such as the plate 22, which is attached to the elastomeric portion of the duckbill check valve 10, is preferably made of metal or other suitable material. The plate 22 has one portion secured to the inlet part 16, and another portion extending into at least the transition part 18 of the valve 10. The plate 22 essentially forms a cantilever extending from the pipe 12 into the duckbill check valve 10, and thus supports the valve which, in a sense, "hangs" from the plate.

This support 20 can be integral (or "embedded") with the duckbill check valve 10, which means that it is built in while the duckbill check valve 10 is being fabricated. Alternatively, the support 20 may be installed, either inside or outside of the duckbill check valve 10 after the duckbill check valve 10 is manufactured. Presently, the plate 22 can be fastened to the duckbill check valve 10 by using mounting mechanism 14 to secure the plate 22 to the inlet part 16 and by using acceptable fasteners, which include adhesives, screws, bolts and nuts, rivets, or wire, to attach the plate 22 to at least the transition part 18. Preferably, the plate 22 is inserted during the building process of the duckbill check valve 10 and vulcanized into place. This has the advantage of protecting support 20, when made of steel or other such materials, from the corrosive effects of the process fluids. It also provides a strong bond between the support 20 and the duckbill check valve 10. Moreover, to increase the bond strength between the support 20, such as a plate 22, and the elastomeric portion of the duckbill check valve 10, a plurality of holes 28 may be drilled or punched in the plate 22, as is illustrated in FIGS. 1c and 1d.

It is important to note that the outlet part 24 may be oriented in different positions, rotatable about the axis of the customer's pipe 12. FIG. 1a shows the outlet part 24 of the present invention wherein the outlet part 24 or "lips" is oriented in a vertical manner. Large diameter duckbill check valves 10 (i.e., twenty (20) inches in diameter or greater) are typically mounted to the end of a customer's pipe 12 with the outlet part 24 in a vertical position. By having the vertical orientation of the outlet part 24, the duckbill check valve 10 will drain completely. If the outlet part 24 were in a horizontal position, it would be on the horizontal centerline of both the duckbill check valve 10 and the customer's pipe 12. Therefore, the customer's pipe 12 would not drain below this centerline.

Furthermore, by having the outlet part 24 in a vertical position, the stiffness of the duckbill check valve 10 is increased, but even so, large duckbill check valves tend to "droop." This "drooping" effect allows the sealing area of the outlet part 24 to become distorted, which subsequently opens up and allows a backflow of water or sewage, which the duckbill check valve is supposed to prevent. The support 20, such as the plate 22, decreases the tendency of outlet part 24 to "droop" under its own weight.

Figure 2A:
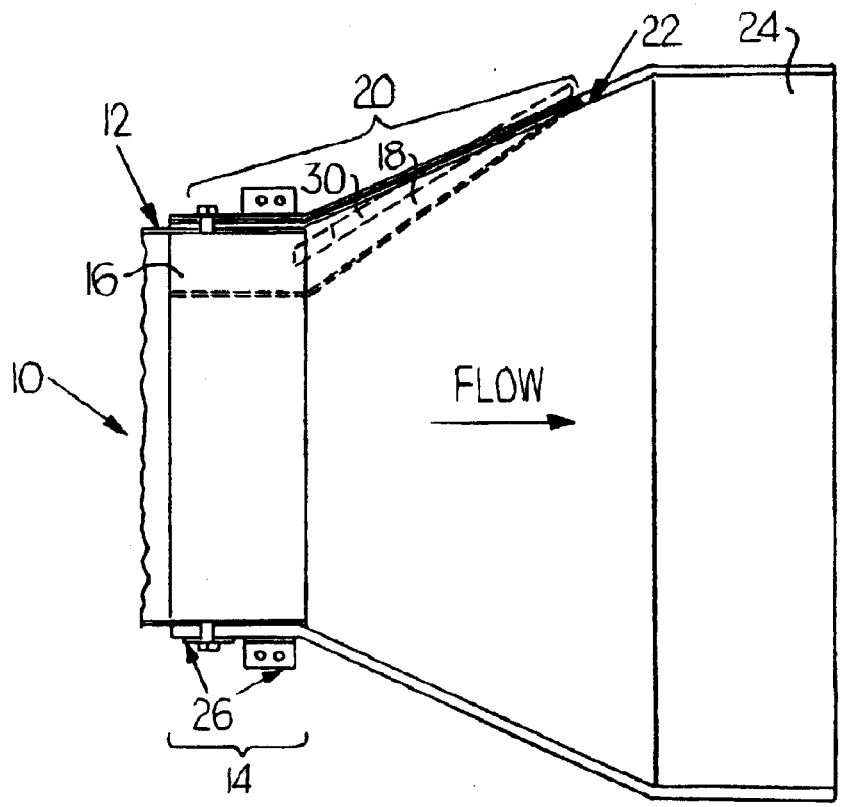
FIG. 2a is a side view of the second embodiment of the present invention in a closed position.
Figure 2B:
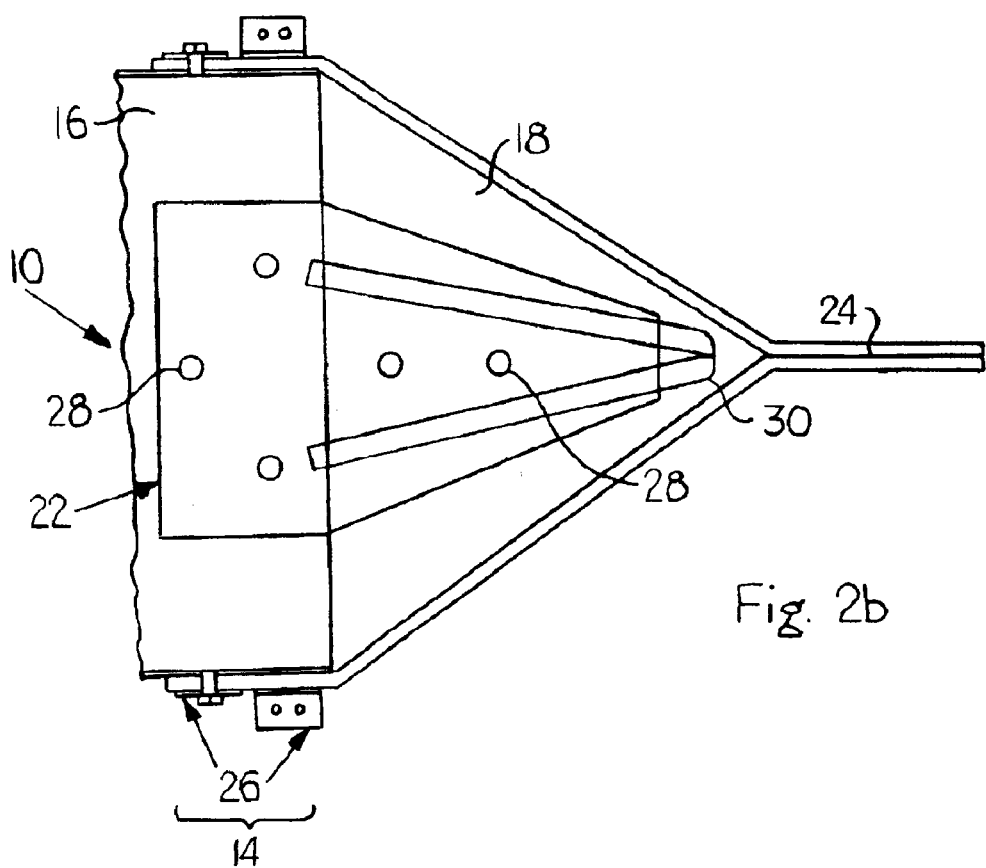
FIG. 2b is a top view of the second embodiment of the present invention in a closed position.

A duckbill check valve 10 with a support 20 according to a second embodiment of the present invention is shown in FIGS. 2a and 2b. In this embodiment, the duckbill check valve 10 is similar to the first embodiment duckbill check valve 10, with like reference numerals indicating similar parts. The second embodiment duckbill check valve also includes at least one bar or "rib" 30 to strengthen the plate 22, as is illustrated in FIGS. 2c and 2d. This bar 30 allows the plate 22 to be thinner and lighter while maintaining the necessary strength to support the duckbill check valve 10. This "rib" can be attached to the plate by appropriate means, such as welding, or alternatively, can be integrally formed into the support plate. Although two bars 30 are illustrated in FIGS. 2a and 2b, the number of bars 30 can be only one or can be as many as will fit on the plate 22. The bars 30 can be located on the top, bottom or on both sides of the plate 22 as long as there is enough space to support the number of bars desired.

Figure 3A:
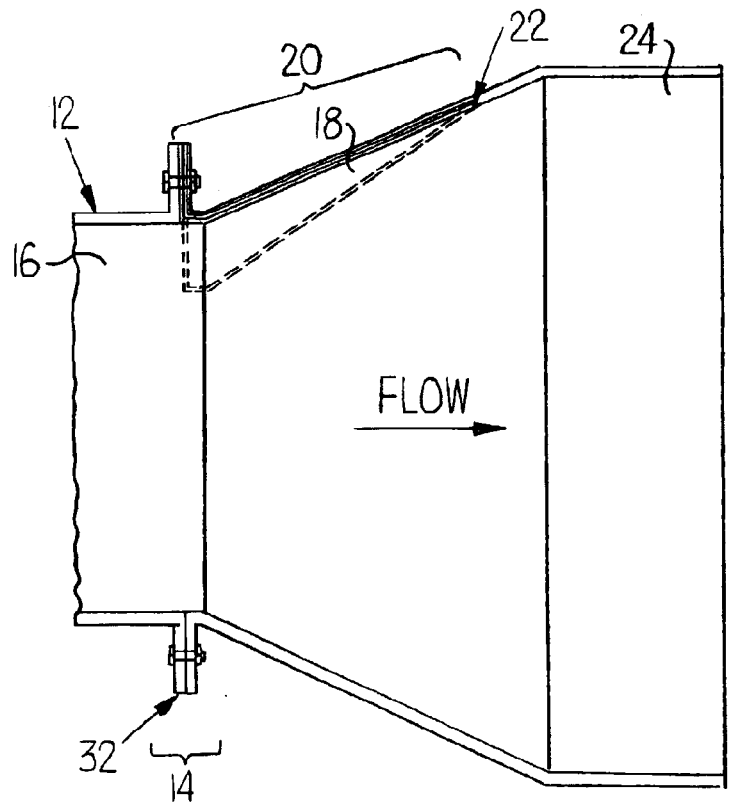
FIG. 3a is a side view of the third embodiment of the present invention in a closed position.
Figure 3B:
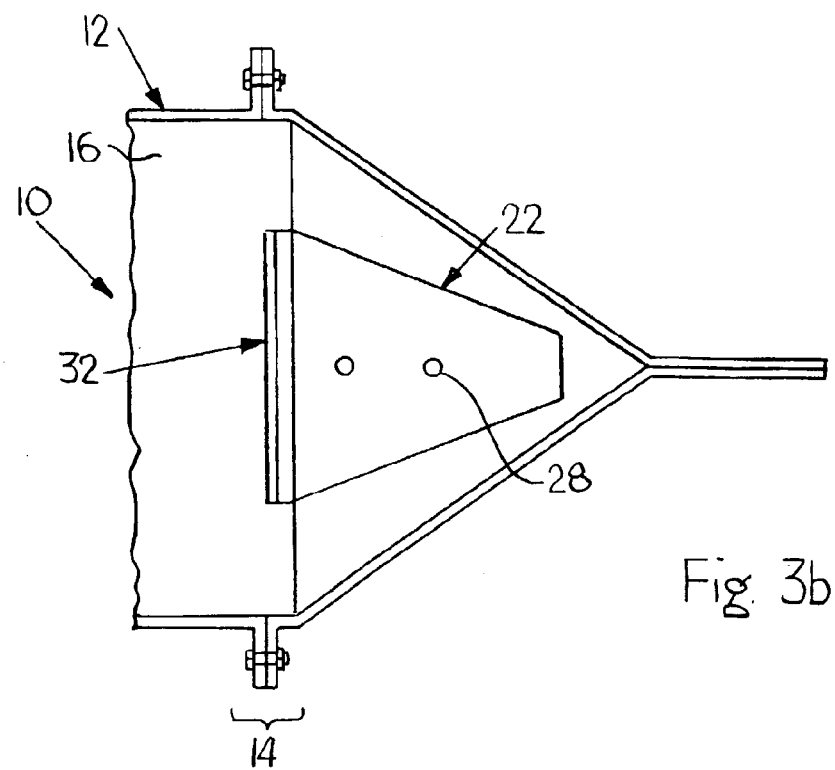
FIG. 3b is a top view of the third embodiment of the present invention in a closed position.

A duckbill check valve 10 with a support 20 according to a third embodiment of the present invention is shown in FIGS. 3a and 3b. In this embodiment, a duckbill check valve 10 is similar to the first embodiment duckbill check valve 10, with like reference numerals indicating similar parts. The third embodiment duckbill check valve illustrates that a support 20 such as a plate 22 can be used in conjunction with a duckbill check valve 10 assembly that uses a "flanged" type mount 32. Here, mounting mechanism 14 consists primarily of customary pipe flange techniques, including nuts and bolts to secure the two meeting flanges on the pipe end and on the valve, respectively. Additionally, to increase the bond strength between the plate 22 and the elastomeric portion of the flange 32 in duckbill check valve 10, a plurality of holes 28 are drilled or punched in the plate 22, as illustrated in FIGS. 3c and 3d.

It is important to note that a support 20 similar to the first embodiment of the present invention can be used with many of the currently available check valves that use a "flanged" type mount 32. However by using a support 20 according to the third embodiment of the present invention in conjunction with a "flanged" type mount 32, the strength of the support can be increased.

Figure 4A:
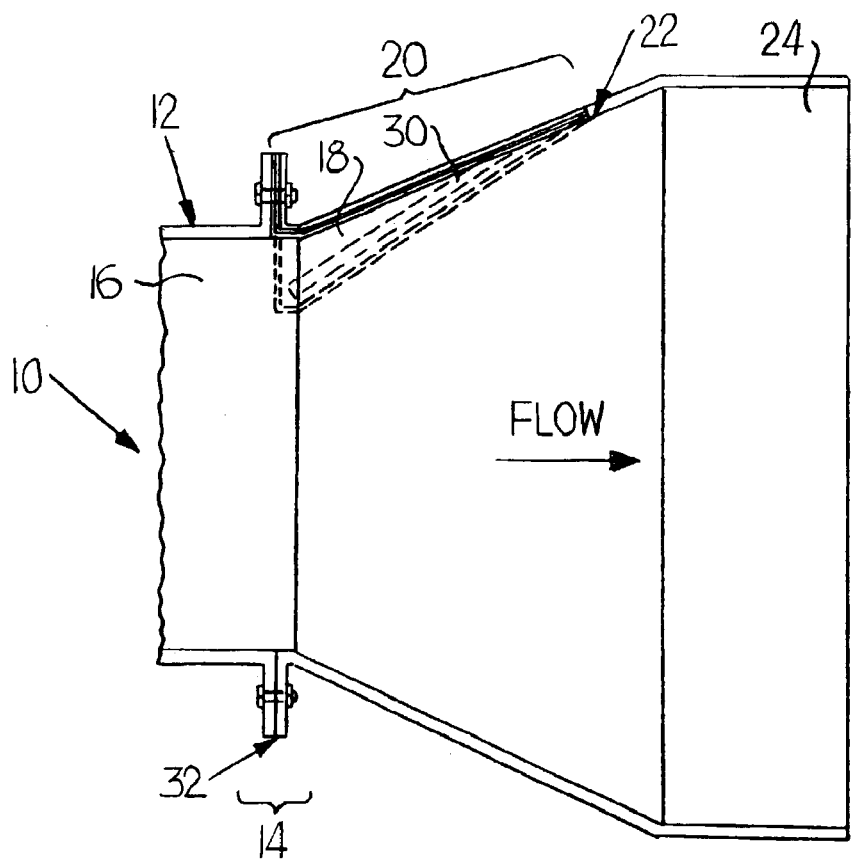
FIG. 4a is a side view of the fourth embodiment of the present invention in a closed position.
Figure 4B:
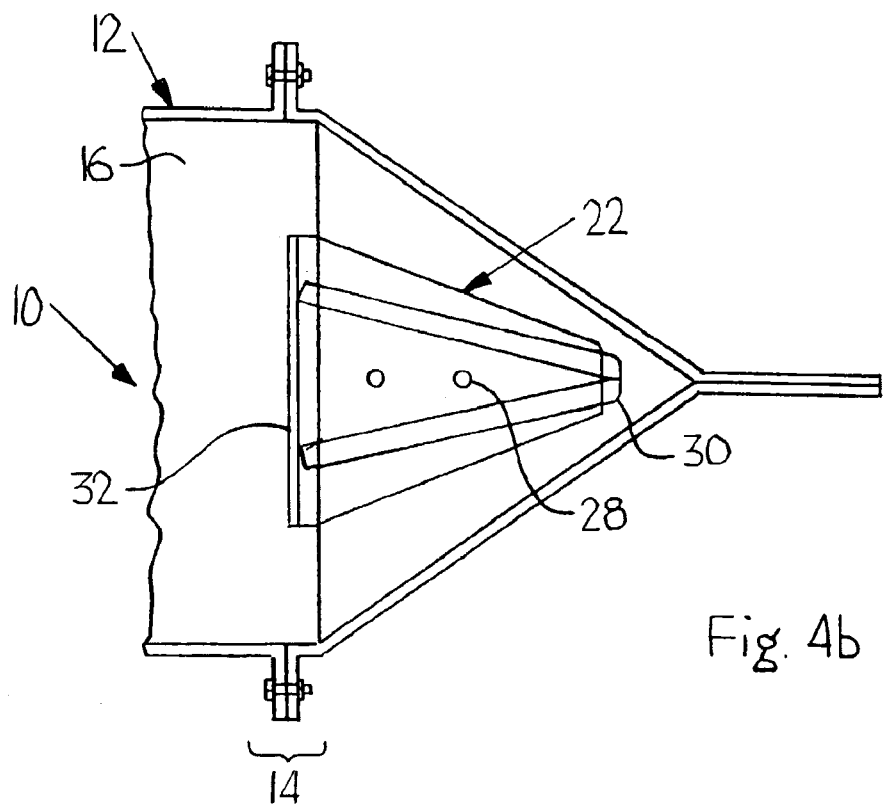
FIG. 4b is a top view of the fourth embodiment of the present invention in a closed position.

A duckbill check valve 10 with a support 20 according to a fourth embodiment of the present invention is shown in FIGS. 4a and 4b. In this embodiment, the duckbill check valve 10 is similar to the second embodiment duckbill check valve 10, with like reference numerals indicating similar parts. The fourth embodiment duckbill check valve illustrates that a support 20 such as a plate 22 can be used in conjunction with a duckbill check valve 10 assembly that uses a mounting mechanism 14 that is considered to be a "flanged" type 32. Moreover, the fourth embodiment duckbill check valve 10 also includes bars or "ribs" 30 to strengthen the support plate 22, as illustrated in FIGS. 4c and 4d.

A support 20 according to a fifth embodiment of the present invention is shown in FIGS. 5a and 5b. In this embodiment, the support 20 is disposed within or on a duckbill check valve similar to both the first and second embodiments of duckbill check valves 10. The support 20 for the duckbill check valve 10 consists of at least on bar 34 welded to a short curved plate 23 for holding the assembly in place. The short curved plate 23 would be in the inlet part 16 and the bar 34 in at least the transition part 18.

Preferably, the fifth embodiment has both the short curved plate 23 and bar 34 inserted during the building process of the duckbill check valve 10 and vulcanized into place. This has the advantage of protecting the support 20, when made from steel or other similar materials, from the corrosive effects of the process fluids. It also provides a strong bond between the support 20 and the duckbill check valve 10. Alternatively, the short curved plate 23 and the bar 34 can be installed, either inside or outside of the duckbill check valve 10, using a suitable fastening means 14 such as adhesives, screws, bolts, and nuts, or wire after the check valve is manufactured.

A support system 20 according to a sixth embodiment of the present invention is shown in FIGS. 6a and 6b. In this embodiment, the support 20 is disposed within or on a duckbill check valve similar to the fifth embodiment duckbill check valve 10. The sixth embodiment duckbill check valve illustrates that a support 20, including at least one bar 34 welded to a short curved plate 23, can be used with duckbill check valves 10 that use a mounting mechanism 14 that is considered to be a "flanged" type 32. The plate 22 would be received in the flange 32, and the bar 34 in the saddle 18.

Figures 7A, 7B:
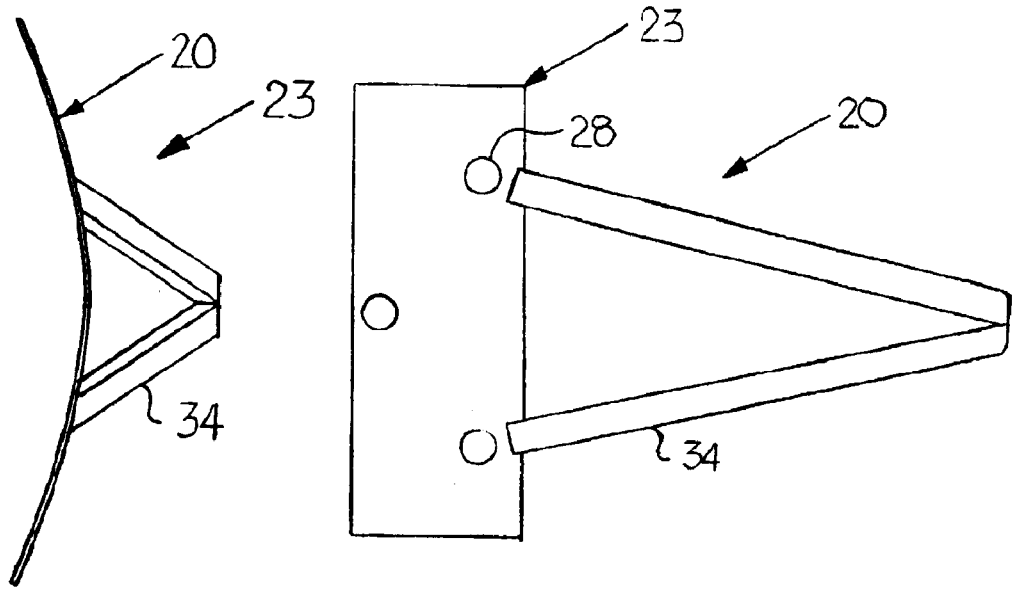
FIG. 7a is a top view of the support according to the seventh embodiment of the present invention.
FIG. 7b is an end view of the support according to the seventh embodiment of the present invention.

A support 20 according to a seventh embodiment of the present invention is shown in FIGS. 7a and 7b. In this embodiment, the support is disposed with or on a duckbill check valve similar to the fifth embodiment duckbill check valve 10. The seventh embodiment duckbill check valve 10 utilizes two bars 34 instead of one bar 34 as illustrated in FIG. 5. The only limitation on the number of bars 34 that can be used is the physical space available to fit them in. Again, short curved plate 23 (with holes 28) is received in the inlet part 16, with bars 34 received in at least the transition part 18.

Figures 8A, 8B:
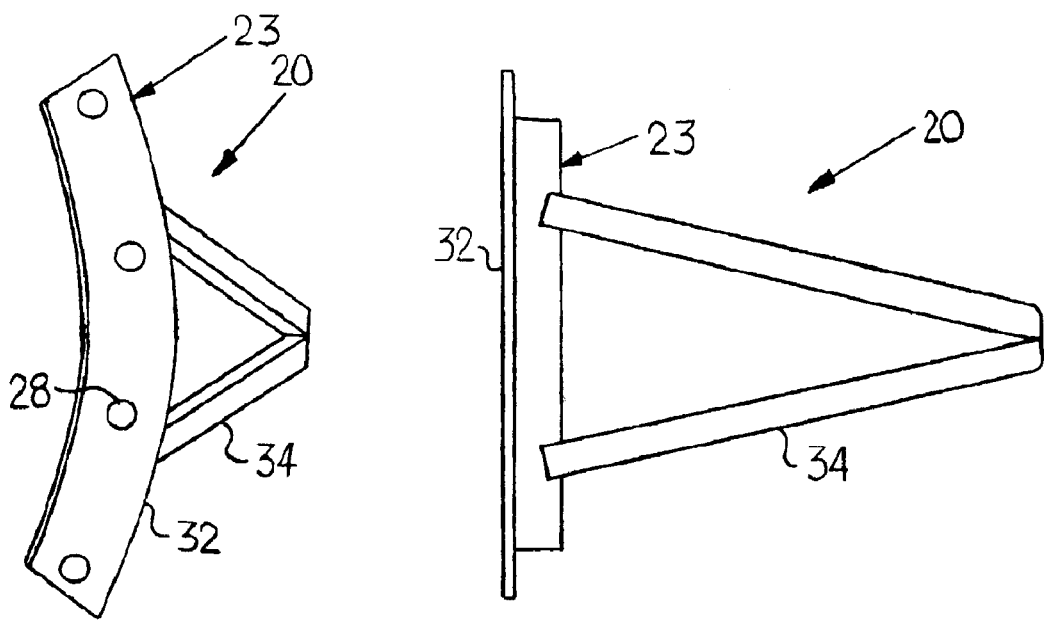
FIG. 8a is a top view of the support according to the eighth embodiment of the present invention.
FIG. 8b is an end view of the support according to the eighth embodiment of the present invention.

Similarly, a support 20 according to an eighth embodiment of the present invention is shown in FIGS. 8a and 8b. In this embodiment, the support 20 is disposed within or on a duckbill check valve similar to the sixth embodiment duckbill check valve 10. The eighth embodiment duckbill check valve 10 utilizes two bars 34 instead of one bar 34 as illustrated in FIG. 6. The only limitation on the number of bars 34 to be used is the physical space available to fit them in.

A method for supporting a duckbill check valve includes the step of installing the support of any of the previously disclosed embodiments of the present invention on either the inside or outside surface of the check valve. Preferably, the support is installed while the check valve is mounted on the customer's pipe, but may be done elsewhere.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A large diameter check valve, comprising:
   an upstream inlet part mountable on the discharge end of a conduit;
   a downstream outlet part adapted to prevent backflow of fluid through the check valve;
   a transition part located between the upstream inlet part and the downstream outlet part; and
   a rigid embedded support plate disposed in an upper portion only of at least both said inlet part and said transition part;
   said support plate including a plurality of bonding holes and at least one reinforcing rib thereon;
   said support plate further having a size and contour similar to an upper portion of at least both the inlet part and the transition part of the check valve.

2. The check valve of claim 1, where said outlet part is mounted with a vertical orientation.

3. The check valve of claim 1, further comprising a flange on the upstream inlet part.

4. The check valve of claim 1, where said check valve is made at least in part from an elastomeric material.

5. The check valve of claim 4, further comprising a synthetic fiber reinforcement in said elastomeric material.

6. The check valve of claim 1, where said upstream inlet part is made at least in part from a stiff durable material.

7. The check valve of claim 1, where said upstream inlet part includes a polyester fabric reinforcement.

8. The check valve of claim 1 further comprising a first flange on said upstream inlet part, and where said support plate further comprises a second flange being connected to said plate, said first flange being connected to said second flange.

9. The check valve of claim 1, wherein said support plate is comprised of a curved plate and at least one bar being attached to said curved plate and at least to said transition part.

10. The check valve of claim 9, further comprising a first flange on said upstream inlet part, and where said support plate further comprises a second flange connected to said curved plate, said first flange being connected to said second flange.

* * * * *